(No Model.)
J. L. BOGERT.
CRANK FOR ENGINES.
No. 325,489. Patented Sept. 1, 1885.
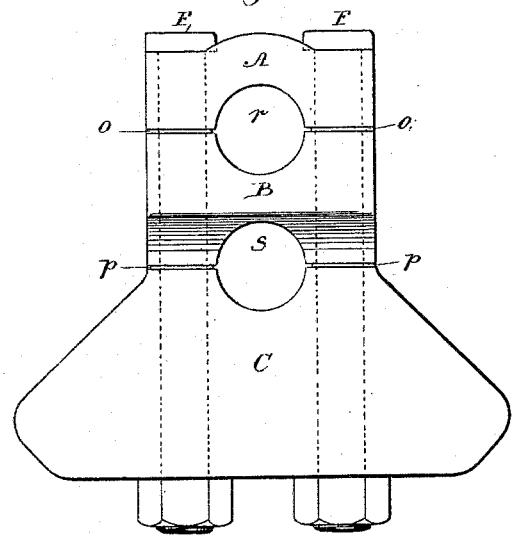
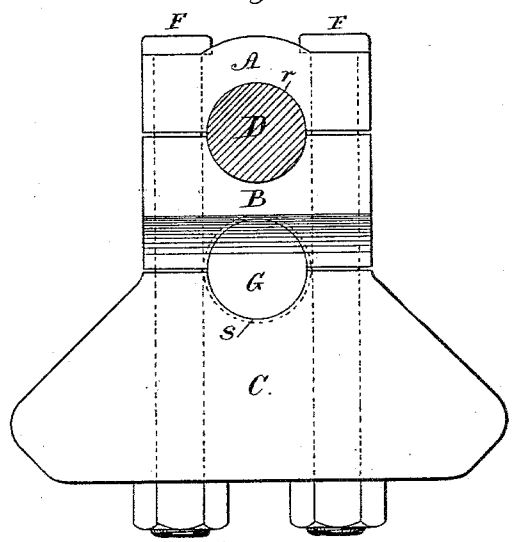
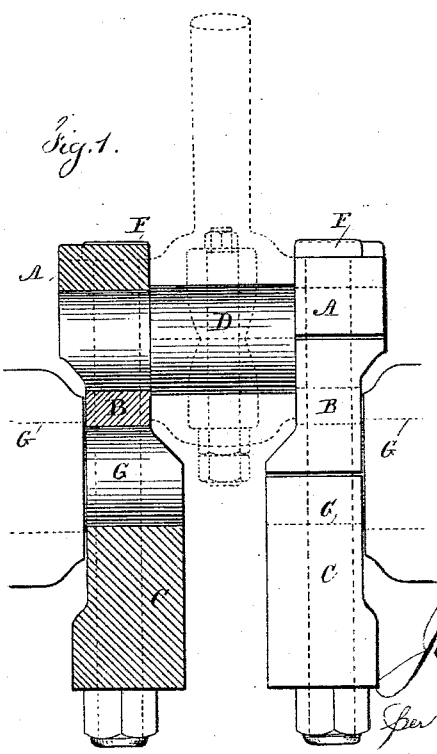

UNITED STATES PATENT OFFICE.

JOHN L. BOGERT, OF FLUSHING, NEW YORK.

CRANK FOR ENGINES.

SPECIFICATION forming part of Letters Patent No. 325,489, dated September 1, 1885.

Application filed January 31, 1885. (No model.)

*To all whom it may concern:*

Be it known that I, JOHN L. BOGERT, of Flushing, in the county of Queens and State of New York, have invented an Improvement in Cranks for Engines, of which the following is a specification.

In the construction of cranks for engines considerable difficulty arises in fastening the crank pins and shafts accurately into the cranks. This is especially the case with shafts where there are two or more engines and two or more pairs of cranks to the one shaft. In cases where the crank-pins are forged with the shaft or made of cast-steel there is risk of flaws, and the parts are very expensive to fit up and finish accurately.

My improvement, although applicable to a single crank, is especially intended for two or more pairs of cranks connected up with line-shafts, such as used with propellers, engines, &c.

In the drawings, Figure 1 is an elevation, partially in section, of two cranks for the connecting-rod of an engine. Fig. 2 shows a side view of one of the crank-arms before the holes are bored for the shaft and crank-pin, respectively, and Fig. 3 is a section through the crank-pin and an elevation of one of the cranks.

Each crank is made of three principal parts. The portion A forms the end of the crank and the cap which holds the end of the crank-pin D in place. The portion B forms the body of the crank, and the portion C forms the counterbalance to the crank and pitman or connecting rod. The surfaces of these pieces A B C which are to be adjacent to each other are planed off true. They are then bored out to receive the bolts F, by which the said parts are to be firmly held together. These bolts F pass at opposite sides of the crank-pin D and the shaft G, after the parts are put together, as hereinafter described.

After the pieces A B C have been planed off and bored the bolts F are put into place; but there are pieces of comparatively thin sheet metal introduced at *o o p p* between the respective surfaces. The bolts F are then tightened and the holes *r s* are bored out, and the sizes of these holes correspond accurately to the sizes of the end of the crank-pin that is to go into the hole *r*, and of the end of the shaft that is to go into the hole *s*. This being done, the pieces of sheet metal *o o p p* are removed and the crank pin and shaft introduced into their respective places, and the nuts upon the bolts F are then screwed up with a powerful wrench, so as to clamp and hold the shaft and crank-pin with great firmness.

After the nuts have been sufficiently tightened the projecting ends of the bolts are riveted up to prevent the nuts becoming loose.

It is to be understood that the shaft and crank-pin are turned up accurately, and that it is preferable to provide a shoulder upon each to take against the surfaces of the crank, and these surfaces upon the crank should be turned off accurately.

By this construction of crank the shaft and crank-pin can be held more firmly and reliably than heretofore, and the parts are stronger and more rigid than they are when the cranks and shafts are forged together. There is but little expense in constructing the parts, because they all can be made by ordinary workmen and with the ordinary lathes, planers, and boring-machines.

Any desired number of these cranks can be applied to one line of shafting. I have shown one pair between two parts of a shaft. Each crank is exactly similar to the other, and when there are two or more engines working upon cranks on one line of shafting these cranks can be placed at right angles, or opposite to each other, or at any desired angle, without change in the construction of the crank itself.

The crank is made thickest at the eye that clamps the shaft, and the offset is inwardly, so that the distance between the two faces is less than the length of the crank-pin between the faces of the crank. This allows a longer bearing for the box at the end of the pitman, and allows only sufficient space for the pitman to pass through freely.

I am aware that two-part cranks have been made, one part having upon it the crank-pin and the other the crank-shaft, and that these parts have been bolted together, but neither the pin nor the shaft was separate and clamped to the crank.

I claim as my invention—

1. The crank composed of the three pieces A B C, and the bolts F to clamp them together and bind the crank pin and shaft respectively, substantially as set forth.

2. The combination, with the crank pin and shaft, of a divided crank with openings bored out in the line of separation for the reception of the crank pin and shaft, respectively, and the tie-bolts that connect the parts of the crank and clamp the divided crank upon the shaft, substantially as set forth.

Signed by me this 26th day of January, A. D. 1885.

JOHN L. BOGERT.

Witnesses:
GEO. T. PINCKNEY,
WILLIAM G. MOTT.